United States Patent
Ene et al.

(10) Patent No.: US 12,393,942 B2
(45) Date of Patent: Aug. 19, 2025

(54) METHOD FOR MOBILE NETWORK OPERATOR-BASED PAYMENT SYSTEM

(71) Applicant: Supertab AG, Steinhausen (CH)

(72) Inventors: Cosmin-Gabriel Ene, Zollikon (CH); Martin Hans, Bad Salzdetfurth (DE)

(73) Assignee: Supertab AG, Steinhausen (CH)

( * ) Notice: Subject to any disclaimer, the term of this patent is extended or adjusted under 35 U.S.C. 154(b) by 0 days.

(21) Appl. No.: 17/714,790

(22) Filed: Apr. 6, 2022

(65) Prior Publication Data
US 2022/0230170 A1    Jul. 21, 2022

Related U.S. Application Data

(63) Continuation of application No. 17/051,045, filed as application No. PCT/EP2019/060785 on Apr. 26, 2019, now abandoned.

(60) Provisional application No. 62/663,653, filed on Apr. 27, 2018.

(51) Int. Cl.
| G06Q 20/40 | (2012.01) |
| G06Q 20/32 | (2012.01) |
| G06Q 20/38 | (2012.01) |
| H04L 67/02 | (2022.01) |
| H04W 4/20 | (2018.01) |

(52) U.S. Cl.
CPC ....... *G06Q 20/401* (2013.01); *G06Q 20/3226* (2013.01); *G06Q 20/3821* (2013.01); *H04L 67/02* (2013.01); *H04W 4/20* (2013.01)

(58) Field of Classification Search
None
See application file for complete search history.

(56) References Cited

U.S. PATENT DOCUMENTS

2014/0222599 A1* 8/2014 Wang ............... H04L 51/222
 705/39
2014/0344153 A1* 11/2014 Raj ................ G06Q 20/385
 705/44
2016/0019536 A1* 1/2016 Ortiz .............. G06Q 20/36
 705/67

FOREIGN PATENT DOCUMENTS

CN    111108523 A  *  5/2020  ......... G06F 21/629

* cited by examiner

*Primary Examiner* — Gregory S Cunningham, II

(57) ABSTRACT

A method, including the steps of: a) receiving, over a mobile communication network, a user device identifier based on information maintained by a database of the mobile communication network, and first purchase price information from an internet-accessible merchant, b) determining whether a data token is maintained in a memory of the user device, c) generating and transmitting the data token to the user device for storage when the token is not maintained, d) determining, based on the user device identifier, a credit worthiness indicator for the user device, e) transmitting an authorization signal for the requested purchase without concurrently requiring payment when the creditworthiness indicator satisfies predetermined conditions, f) monitoring a total outstanding purchase balance, and g) transmitting a request signal for the user device for settlement of at least a part of the total outstanding purchase balance if this exceeds a predetermined threshold amount.

20 Claims, 7 Drawing Sheets

METHOD FOR MOBILE NETWORK OPERATOR-BASED PAYMENT SYSTEM

CROSS-REFERENCE TO RELATED APPLICATIONS

This application is a Continuation of U.S. patent application Ser. No. 17/051,045, filed on Oct. 27, 2020, which is a National Stage Application of PCT/EP2019/060785 filed Apr. 26, 2019, which claims priority from U.S. Provisional Patent Application No. 62/663,653, filed on Apr. 27, 2018. The priority of said PCT and US Provisional Patent Application are claimed. Each of the prior mentioned applications is hereby incorporated by reference herein in its entirety.

FIELD OF THE INVENTION

This disclosure pertains to a method for a mobile network operator-based payment system that enables a mobile user device ("UE") to be identified by connecting to a micro-payment system or a content provider system via a mobile network, or alternatively via a data network, by means of a token or browser fingerprint stored and/or generated by one or more of the mobile network, UE, micro-payment system or content provider system.

BACKGROUND

For online shopping, various possibilities exist to pay for ordered goods. Online shops often request new users to register with their real name and email address. During the shopping process, the mail address for shipping non-digital goods and credit card information is requested before a purchase is finally accepted by the online-shop. For digital goods like audio or video media data, the process is very much the same without the mailing address request.

Alternatives to providing a credit card include various other types of bank accounts. Another alternative is to transfer money to the online shop via bitcoins and/or other cryptocurrencies.

There are other established payment systems that offer a payment service to shops and customers with benefits over the simple registration described above. Some services include a registration only at the payment service, usually trusted by customers. These services require only an email address to be provided to the online shop. The shop then requests settlement of a bill from the payment service and based on the mail address and the customer's registration the payment service communicates with the customer and finalizes the purchase, finally providing the registered shipping address to the online shop.

These and other payment services have in common that they require not only an agreement to pay before the purchase is actually finalized, but also that payment has taken place. For digital goods, this means that a credit card is debited or that a payment service transfers the purchase amount to the online shop before the digital data is delivered to the customer by the shop.

An exception of this basic mechanism is introduced in U.S. Patent Publication No. 2014/0258106 A1 to Enc ("the '106 publication"), which is hereby incorporated by reference in its entirety herein. The '106 publication describes a payment system and methods for a plurality of payment processes. The system and methods are invoked for a buyer system making a purchase in an online shop for a certain purchase amount. The system:

identifies a buyer system, e.g. by loading a script within a web page onto the buyer system, executing the script to generate a fingerprint of the browser and transmitting the fingerprint information to the system, stores the identification of the buyer system, e.g. the fingerprint information, stores the purchase amount in relation to the identification number, monitors the total amount of purchases of the buyer system, receives a request from the online shop to account for the purchase amount, sends a request for settlement of at least a part of the total amount of purchases to a user of the buyer system only when the total amount of purchases exceeds a predefined value and/or after the expiry of a predefined time interval.

In summary, the '106 publication describes a system that allows a buyer to make purchases online with a buyer system for a purchase amount which the buyer firstly does not have to settle. The payment system accumulates the amounts of purchases from the buyer system, and only when the total amount of due payments exceeds a predefined value, the buyer is requested to settle the total amount or a part of it. The buyer system can be a PC or a mobile phone or the like. The purchases and purchase amounts are stored by the payment system in relation to a buyer system identification which preferably does not identify the buyer nor require a prior registration or any other user interaction.

One problem faced by the payment system in this case is reliably identifying the buyer system. For example, the script used to generate the fingerprint for the browser may fail, or different buyer systems (browsers) used on a single device may falsely lead to different buyer system identifications.

SUMMARY

The prior-art offers various online payment systems, including username/password based and device identification based systems. Yet, it appears that no known payment systems efficiently combine the benefits of a subscriber device identification that is inherent to a mobile communication network with web browser-based client identification. The prior-art does not disclose payment systems that utilize both identification methods depending on the network a client uses and that combine both methods to securely identify clients over various networks.

At the core of the invention is a micro payment system offered by or with support of a cellular mobile network. This invention is in no way restricted to cellular or radio access technologies. The term "mobile network" is used to mean networks that clearly and securely identify subscribers and subscriber devices, e.g. by means of a subscriber identity module (SIM) and pre-shared secrets stored on the SIM and a subscriber data base. As this is a typical characteristic of a (cellular) mobile network, we use this term without restricting the invention.

One of the novel steps included in the disclosed invention is the identification by the payment system of a subscriber and/or a subscriber device, such as the UE, requesting content from a content provider ("CP"). This identification is based on data flows or sessions, in the following denoted Protocol Data Unit ("PDU") sessions," the UE uses to access the payment system. The identification of the UE is used to associate it with an account or a wallet which stores information about content already purchased and a total amount due for non-settled purchases. The account or wallet may, for example, be stored in the payment system itself or in a data base of the mobile network.

The identification of the UE by means of the PDU sessions used for the UE for accessing the payment system is only possible within the cellular mobile network, so that the payment system must either be a part of the mobile network or "closely connected" to the mobile network, i.e. the mobile network provides the identification information. Typically, the mobile network operator may operate or control the payment system itself. This network-based identification is the main benefit for a payment system offered or supported by an operator of a mobile network that applies secure identification over payment systems offered independently of the network operator.

The invention enables a payment system to identify a buyer system (UE) securely, quickly and easily via its connection to the UE through the cellular mobile network.

Additional aspects of the invention ensure that a UE can be identified and associated to its wallet also in cases, when it does not access a CP through the cellular mobile network, but for instance gains access to a CP through a public or private wireless LAN (WLAN) and fixed network.

One such aspect involves generating and storing in the payment system a token identifying the UE, and transferring the token to the UE for storage in association with the CP. The token may, for example, be transferred to and stored in the UE by transfer of HTML code from the CP and storage of a cookie by a browser application receiving the code. One example of such token is a UE identity stored in a cookie in the UE in the context of the CP's website.

Another alternate aspect involves generating and storing in the payment system another token identifying the UE and transferring the token to the UE for storage in association with the payment system. The token may be transferred and stored in the UE by transfer and execution of software from the payment system to the UE. One example of such token is a UE identity stored in a cookie in the UE in the context of the payment system's website.

Either or both of these tokens may be generated when the UE accesses the CP via the mobile network, and they may be used in subsequent requests for content from a CP to identify the UE in cases the UE accesses the CP through another than the mobile network.

Also, either or both of the tokens may be generated when the UE accesses the CP via another network, and they may be associated in subsequent requests for content from a CP to a mobile network-based UE identity in cases the UE accesses the CP through the mobile network.

Another aspect of the present invention involves the generation of a fingerprint identifier of at least a part of the UE by a software (script) executed on the UE and provided to the UE by the payment system. The fingerprint identifier is generated while the UE is already identified by the payment system, and it is stored in the payment system in association with the UE.

The fingerprint identifier may be used in subsequent requests for content from a CP to identify the UE in cases when the UE accesses the CP through another than the mobile network, and no preexisting token is available for identifying the UE in the payment system. In this case, the fingerprint of an already identified UE is generated for identification of subsequent accesses through other networks not providing an identification otherwise.

In another aspect of the present invention, the payment system selects the method for identification, e.g. a network based identification or a token or fingerprint based identification, based on one or more of the following:
  the network a request originates from,
  a data flow or session that is used for transmission of a request, while information of the flow or session has been provided by the network, or
  information received from the network in association with a request.

Another aspect of the present invention applies the ideas described above to identify an account in a payment system (wallet) or a user associated to a payment system over several user-owned devices. A user may use different mobile devices via a single subscription to a mobile network so that association to the same wallet in a payment system is easy when the payment system is accessed through the mobile network. If, however, the payment system is accessed through a public or private network, e.g. via WLAN, different fingerprint information and/or different tokens may identify the different devices. It is thus an important aspect of the current invention of being able to associate multiple different fingerprint information and/or multiple different tokens with a user identification, each of the fingerprint information and/or different tokens being associated with a different device.

Certain devices may never access any services through the mobile network (for example, such as laptops or PCs). These devices cannot use the mechanisms of combined identification via subscriber information and fingerprint. The present invention addresses this limitation with the following functionality: Most mobile network operators offer to their customers a web-based service interface to access, control or manage services. Examples are access to the monthly telephone bill, changes to their subscription (prolongation of contract), or ordering of phones or accessories etc. When a subscriber accesses such services via browser, e.g. using username and password or other authentication mechanisms, the mobile network operator may provide an executable script to the user's device that generates a fingerprint and provides it to the network. The mobile operator may store this fingerprint in association with the subscription to identify the browser and thus identify the device and user when a payment system is subsequently accessed from the device.

BRIEF DESCRIPTION OF THE DRAWINGS

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

In the following description, the same reference signs are used for the same and similarly acting parts.

Figure 1:
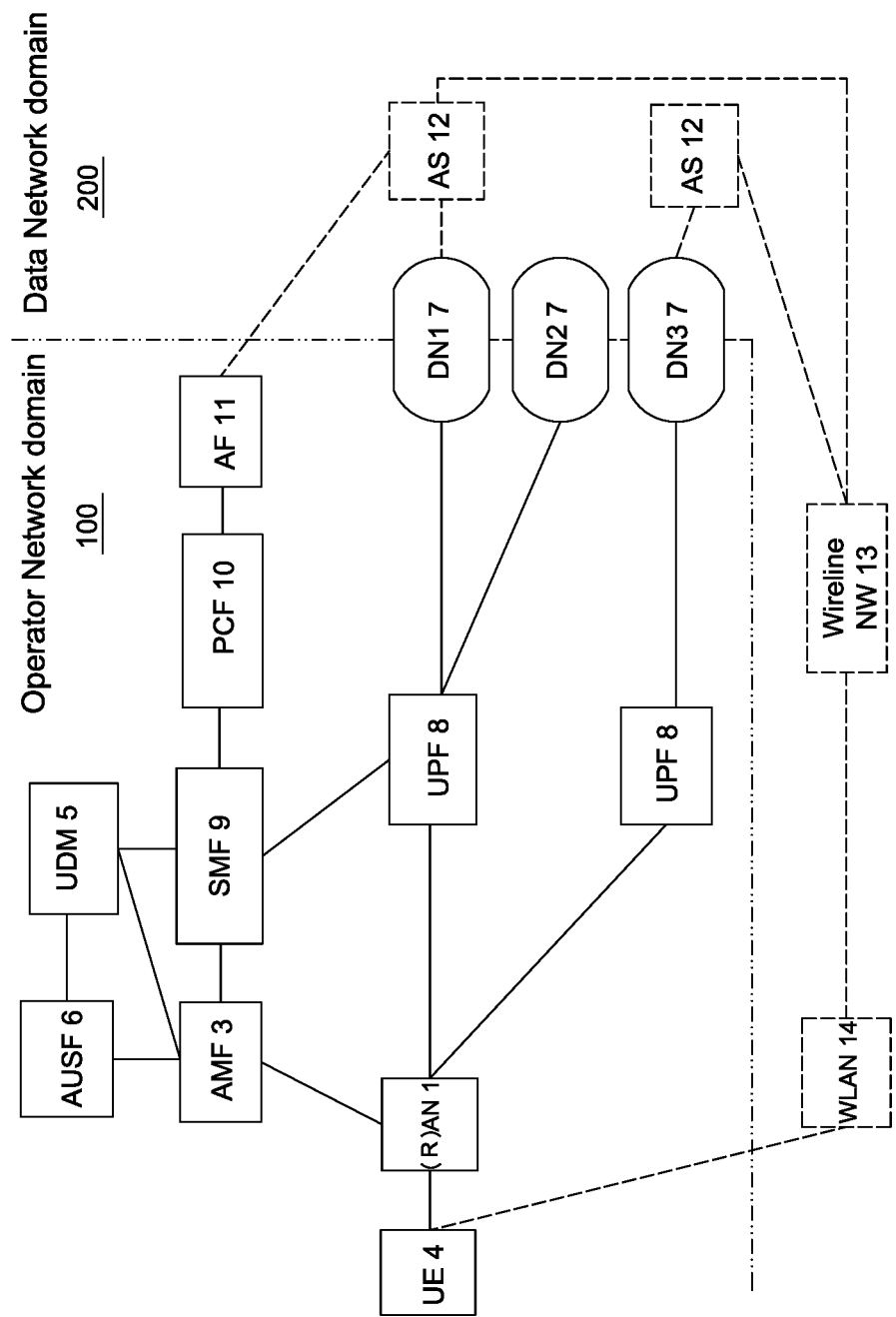
FIG. 1 presents a schematic diagram depicting an exemplary 5G core network architecture in the related arts.

For purposes of illustrating aspects of the present invention, a basic architecture of a next generation ("5G") core network that is currently under development by various industry standards bodies is described. Only those elements or functions are described that are necessary to understand principles of the present invention, and acknowledge that additional elements and functions will likely be needed to deploy an actual network. FIG. 1 shows a representative core network ("CN") architecture for 5G. It is very similar to a core network architecture of the 4G system called Enhanced Packet System (EPS) or Enhanced Packet Core (EPC), and it is anticipated that the current invention can be applied to enhance various networks and network architectures sharing similarities with these network architectures.

As illustrated in FIG. 1, a cellular mobile network operating in an operator network domain 100 includes a core network ("CN") and an (remote) access network ("(R)AN") 1. The access network 1 provides mainly cellular radio access to a mobile device (UE 4), e.g. via GSM, UMTS, LTE or 5G NR (new radio). Additional access networks may provide access via short range radio access, e.g. WLAN, fixed or satellite access to mobile or fixed devices (not shown in FIG. 1). The access networks usually provide necessary functionality to setup, control and maintain radio or wireline connections between network and devices.

The core network (CN) provides functionality that is not access specific, e.g. authentication, authorization and accounting (AAA) of devices and/or subscribers, mobility between access networks, routing between the access networks and external data networks and control of quality of service (QoS).

As depicted in FIG. 1 and in operation, a UE 4 accesses the CN through an access network that may be (R)AN 1. The (R)AN 1 provides a connection to an Authentication and Mobility Function ("AMF") 3. The AMF 3 may, as many or all elements depicted in FIG. 1, be present multiple times in a single CN. An AMF 3 is usually selected to service a UE 4 at the time of registration of the UE 4 in the network, and only one AMF 3 is responsible for a single UE 4 at a time. The AMF 3, as all elements of the CN, can communicate to other CN elements through respective interfaces. The AMF 3, for example, may connect to a user data management ("UDM") 5 to receive information about subscribers and subscribed services, and to an Authentication Server Function ("AUSF") 6 to authenticate the UE 4 at registration and to get security credentials used for communication with the UE 4.

A UE 4, when accessing a cellular mobile network, registers with an AMF 3 via a base station of the access network. The registration usually comprises fetching subscriber data by the AMF 3 from the UDM 5 and performing authentication between the Authentication Server Function ("AUSF") and a SIM-Card of the UE 4. With this authentication the subscriber and potentially also his device is securely identified and e.g. accounting and billing on the subscriber's account is possible. Thus, authentication is a pre-requisite for nearly all services offered to a UE 4 with only few exceptions.

A registered UE 4 may request service from the network. A typical service request may be directed to data exchange between the UE 4 and an external data network ("DN") 7. Examples DNs 7 may include the internet for unspecified user data or Over-the-Top applications, an operator managed IP-based Multimedia Subnetwork (IMS) for Voice-over-IP communication or any service-specific data network for e.g. a streaming video service.

For data communication, a logical connection between UE 4 and a gateway to the respective DN 7 needs to be established. The logical connection (denoted PDU Session) may comprise a fixed route that is established through the CN. The fixed route of a PDU session may utilize user plane functions ("UPFs") 8 that are routers or gateways to DNs 7 in the 5G core network. A UE 4 requesting a service will thus request from the AMF 3 setup of a PDU Session with a DN 7, and will preferably provide requested QoS parameters. The AMF 3 selects a Session Management Function ("SMF") 9 to setup the data path in the CN between access network and UPF(s) 8, including setting the required parameters in the involved network functions.

A UE 4 may request multiple PDU Sessions to the same DN 7, for example, if multiple applications with different QoS demands require data exchange with the same DN. A UE 4 may also request PDU sessions to different DNs 7 in parallel for different applications, for example to have voice connection in parallel to internet data and a streaming service. FIG. 1 shows the UE 4 connected to a (R)AN 1 and via a UPF 8 connected to two different DNs 7. The same UE is connected via the same AN through a different UPF to a third DN. FIG. 1 also shows a dashed line separating the operator network domain 100 (comprising AN 1 and the CN) from a data network domain 200 comprising application servers 12 and various other functions and entities outside the scope of the network operator.

We note that the data network domain 200 may include networks that also have operators. The term "network operator" as used herein is intended to refer to the operator of a "cellular or "mobile network." The term (cellular) mobile network is intended to refer to a network that offers cellular mobile radio access to mobile devices according to known communication standards and architectures. This does not preclude the (cellular) mobile network from offering non-cellular mobile access or fixed, e.g. wireline, access to the network. However, the mobile networks differ from other access mechanisms using different infrastructures (e.g. wireline networks or public WLAN infrastructure.)

To ensure the PDU Session is setup according to the services subscribed by the subscriber, the SMF may request the UDM to provide subscriber data related to services subscribed. In addition, the SMF 9 may invoke a Policy Control Function ("PCF") 10 to take into account the general network policies (for example, rules for derivation of QoS), current network load and other real-time information to adapt the PDU Session parameters.

The PCF 10 may interact with an Application Function ("AF") 11 to communicate with an external application server ("AS") 12. This may be particularly useful if a DN 7 has application servers that need to influence the setup of data connections to UEs 4 accessing the DN 7. Because external AS 12 cannot access the operator's CN directly, they communicate via an AF 11 to exchange, for example, additional authentication data for authentication of the UE 4 in the DN 7, or they exchange QoS information to ensure the data path is setup according to certain minimum or maximum quality requirements by the DN 7. Also, AS 12 may receive information such as location information or availability status information about a UE 4 via the AF 11. In FIG. 1, AS 12 is shown with dashed line to emphasize that they belong to the data network domain 200 outside the operator network domain 100.

Finally, the SMF 9 has setup the CN and the access network to provide the required data path, and the UE 4 is informed about the PDU session setup and its parameters.

FIG. 1 also includes a simplified second network, a wireline network (Wireline NW) 13 that offers internet access to the UE via any kind of access network, for example, such as a WLAN. The wireline network 13 is not a part of the mobile network, it is outside the operator network domain 100 described above and therefore shown with dashed line in FIG. 1. The wireline network 13 may offer access to the internet or any other network. Application servers 12 may be accessible via the wireline network, for example including the same or different application servers 12 that are also accessible via the mobile network described above.

Accordingly, a UE 4 may have two different access paths available to access a service or application server: via the mobile network or a wireline network. The present invention utilizes different aspects of both networks to beneficially enhance payment systems and user device identification.

Figure 2:
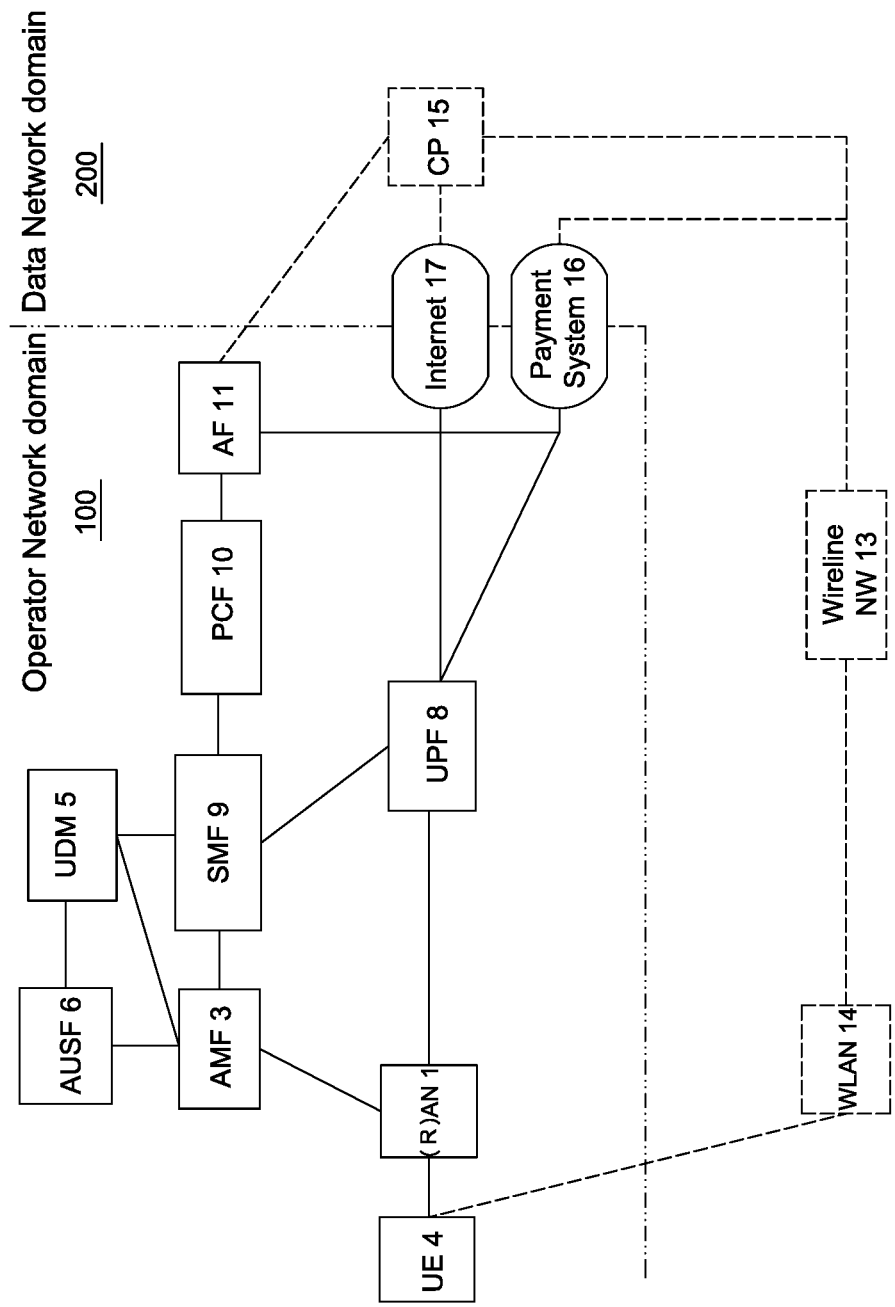
FIG. 2 presents a schematic diagram depicting core network architecture supporting aspects of the present disclosure.

FIG. 2 shows a network similar to the general network of FIG. 1 with operator network domain 100 and data network domain 200, and elements associated with a first embodiment of the present invention. Identical components or devices in FIGS. 1 and 2 are like-numbered for ease of understanding.

In FIG. 2, a UE 4 may request internet access from a mobile network in a conventional manner as described with regard to FIG. 1. A first PDU session to the internet is setup via a radio access network (R)AN 1 and one or more UPFs 8. The UE 4 may access various services in the internet at the same time, one of these services being media content provided by a CP 15.

To pay for content that the UE 4 requests from the CP 15, a payment system 16 may be used. To access the payment system 16 through a mobile network, a second PDU session may be set up through the same RAN 1 and UPF 8. In FIG. 2, the payment system 16 is shown at least in part as part of the operator network domain 100, e.g., a mobile service provider's network. However, payment system 16 can alternatively be fully deployed in the data network domain 200, e.g., disposed within or accessible from the internet, therefore having a close connection to the mobile cellular network. Another alternative would be to deploy the payment system 16 fully in the mobile network and provide access to the payment system 16 from outside the mobile network through interfaces to the operator network domain 100, e.g., via the AF 11. FIG. 2 shows the payment system 16 as part of both domains 100 and 200 for ease of understanding.

For the functions of the core network, e.g. AMF 3 and SMF 9, the payment system 16 may be treated as a standalone data network separated from the internet 17 and other potential data networks. Alternatively, the payment system 16 may be accessible via the internet 17 also used to access the CP 15.

The setup of the PDU sessions, involves using the AMF 3 to register the UE 4 in the mobile network domain 100 (if not already registered) and using an SMF 9 to setup and maintain the data route of the PDU sessions. A PCF 10 may influence the setup and the parameters of the PDU session.

In addition, the CP 15 and the payment system 16 may both be accessible via another network, e.g. a wireline network 13 which includes, for example, a WLAN 14 access for/to the UE 4. Therefore, the UE 4 has two alternative routes to both the CP 15 and the payment system 16, one which uses the mobile network in the operator network domain 100, and another which does not go through the mobile network.

When a user accesses the CP 15 using his/her UE 4, and requests content using a service interface, e.g. a web interface, via the mobile network, the UE 4 may be provided with a link that redirects the UE 4 to the payment system 16 for the purpose of identifying the UE 4. Identification of the UE 4 may involve checking access of the UE 4 to the content, and requesting the user's agreement to pay a fee for the content. Alternatively, the UE 4 may be provided with a script that when executed by the UE 4 accesses the payment system 16 and identifies the UE 4, verifies access, and requests agreement to pay. In both alternatives, the UE 4 has a PDU session to the internet to access the CP 15, and the UE 4 has an additional connection to the payment system 16.

In FIG. 2, the payment system 16 is also as least partially located in a separate data network domain, i.e., in data network domain 200. In such a configuration, the UE 4 may request a second PDU session to connect to the payment system 16. The request is sent to the AMF 3 and forwarded to an appropriate SMF 9. As only one SMF 9 is shown in FIG. 2 for ease of depiction, we assume the same SMF 9 as before is selected. The SMF 9 will setup a route between the (R)AN 1, e.g. the mobile base station, and the payment system 16 that provides mobile access to the UE 4. In this example, the same UPF 8 as before is selected. The setup of this second PDU session may involve the SMF 9 requesting authorization for the UE 4 to access the payment system 16 from the UDM 5 and/or selection of payment system 16 or route parameters by the PCF 10. A second PDU session will be established so that the payment system 16 can identify the UE 4.

The payment system 16 may, for example, when triggered by the second PDU session establishment, contact an application function (AF) 11 whose function is to manage communication between the core network and external service providers for purposes of identification of the UE 4 that uses the PDU session. The AF 11 may additionally or alternatively be triggered by the PCF 10 during establishment of the additional PDU session to contact the payment system 16. The AF 11 may receive from the PCF 10 or from the UDM 5 identification information of UE 4 which may be subscriber and payment system-specific. This information may not reveal the subscriber's real identity, but otherwise uniquely identify the UE 4 to the payment system 16. The AF 11 may provide the subscriber identity to the payment system 16 in conjunction with an identification process that identifies the connection that is established between the UE 4 and the payments system 16, e.g. a PDU session identification.

The payment system 16 then has a connection with the UE 4 and the UE 4 is already identified by the payment system 16 before any data is exchanged with the UE 4.

If the payment system 16 is not accessible via a dedicated DN 7 associated with or accessible to the mobile network 100, such payment system 16 may be accessible via the same DN 7 that also provides access to the internet. The payment system 16 would then be treated by the mobile network 100 similar to a conventional application server, yet with special authorization to connect to an AF 11 and receive subscriber identification as described above. In this embodiment of the present invention, a separate PDU session would not be necessary because the payment system 16 would be accessible via the PDU session that is already setup for connections to the CP 15. In this case, in order to ensure setup of a separate PDU session, the UE 4 may have received policies, as part of the registration process or any other procedure prior to accessing the CP 15, that trigger the UE 4 to request setup of an additional PDU session to the payment system 16 via the same internet DN 7. This is beneficial as the setup of a payment system specific PDU session allows the network to better control the data flow to and from the payment system 16 and support the payment system 16 with a connection identification. The connection identification cannot be a PDU session identifier, as the PDU session does not terminate in the payment system 16 but in the UPF 8 providing access to the internet. The connection identification may be the IP-address and port numbers used, or a tunnel identifier if the UPF 8 and payment system 16 setup a tunnel, e.g. an IPsec-tunnel, for exchange of data to and from the UE 4. Any other connection identifier can also be used.

The mechanism described above allows the payment system 16 to identify the UE 4 using the mobile network. These processes may be used also with other aspects of this invention which will be described in the following description.

Figure 3:
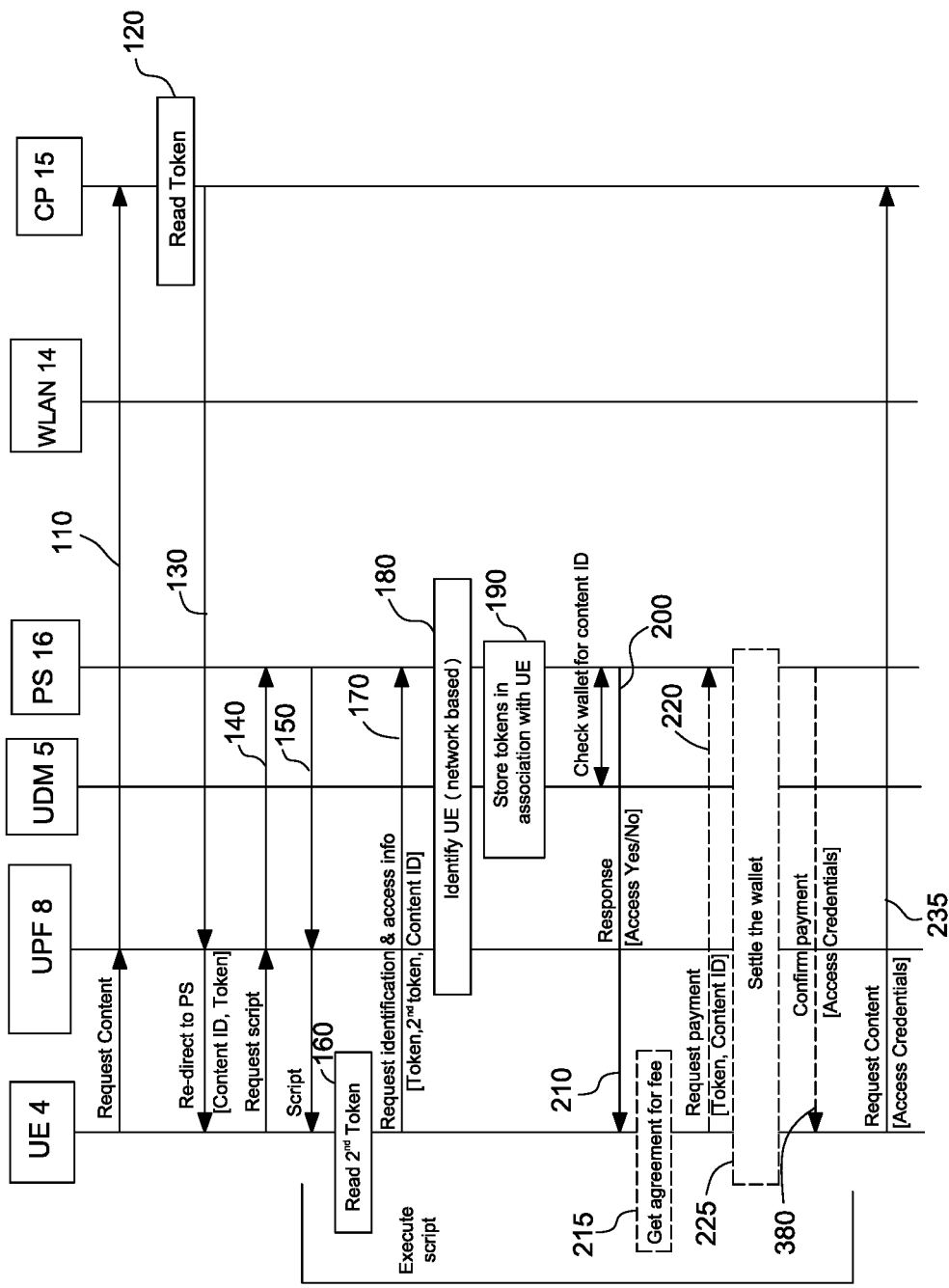
FIG. 3 presents a message sequence chart depicting a first method for identifying a user device in accordance with aspects of the present disclosures.

FIG. 3 illustrates exemplary procedures according to the present disclosure in a message sequence chart format. As shown in FIG. 3 a UE 4, a UPF 8, a UDM 5, a payment system ("PS") 16, a wireline network 13 providing access to the UE 4 via a wireless local area network (WLAN) 14, and a CP 15. FIG. 3 does not show details of registration in the core network and setup of connections or PDU sessions, which may be performed in a conventional manner. The figure assumes the necessary setup procedures are executed in parallel to the procedures illustrated by the figure. Therefore, it should be understood that FIG. 3 and the figures that follow do not show the complete messages exchanged between the respective entities, some of which are shown in FIG. 2, but only messages that are important to understand relevant aspects of this invention.

Referring to FIG. 3, in step 110, the UE 4, having access to the internet through the mobile network of the operator network domain 100, requests content from a CP 15 via the UPF 8. This is indicated in FIG. 3 by an arrow identified as "Request Content" which extends from the UE 4 vertical to the CP 15 vertical via UPF 8. In step 120, the CP 15 reads a token that has been stored on the UE 4 in a previous interaction with a CP 15. The token may be stored in an HTTP or browser cookie on the UE 4, and the cookie may be provided to a web server of the CP 15 during or before the request for content in step 110.

The aim of reading the token in this exemplary procedure is not to specifically identify a user of the UE 4, but to associate the token with a UE 4 identity received from the mobile network 100. The token may have been stored in the past while the UE 4 accessed the same CP 15 over a WLAN 14 connection, and it is advantageous for the CP 15 and the payment system 16 to identify a single UE 4 from both a token and a mobile network-based access.

In step 130, the CP 15 responds to the request with a re-direction to the PS 16. This re-direction includes an identification of the content the user requested and the token that was read. The re-direction may for example be in the form of a re-direct order which includes a hyper-link to an address of the payment system 16 to enable the UE 4 to request an executable script from the PS 16 in step 140. The re-direction may also be in form of a link to a script provided by the payment system 16 as shown in step 150 that needs to be loaded to and executed by the UE 4.

The UE 4 may have previously stored a second token, e.g., the second token was stored in the context of the payment system 16 and provided by the payment system 16 in past payment sessions. In step 160, this second token is read when executing the script. For the described procedure, it is not necessary that both the token of the CP 15 and the second token from the payment system 16 are present. Either one of the tokens is sufficient to perform the described tasks, however for the sake of completeness we included both tokens in the example procedure.

The UE 4 may then, in step 170, access the payment system 16 requesting identification of the UE 4 by the payment system 16, providing the tokens and the identification of the content the user requested. The network then identifies the UE 4 in step 180. The identification is shown to be done, for example, between the PS 16, the UDM 5 and the UPF 8. As explained above, the actual identification information may have been provided by the UDM 5 to the payment system 16 (via PCF and/or AF) in association with a PDU session between UE 4 and payment system 16 before the procedure started. The identification would then simply be the identification of the connection the request is coming from.

After the UE 4 is identified in step 180, the token(s) received from the UE 4 are stored in the UDM 5 in step 190 so that going forward any data stored in association with any of the tokens is associated with the UE 4 identification provided by the mobile network 100. A single wallet, for example, could then contain information accounting for both purchases by the UE 4 via WLAN 14 and purchases by the UE 4 via a mobile network 100.

In step 200 of FIG. 3, the payment system 16 checks the identified wallet to see whether the UE 4 may access the specific content identified. If the user has access, the payment system 16 responds with an access indication in step 210. Otherwise the payment system 16 responds by indicating that it is necessary to get the UE 4's agreement for payment in step 215, and a payment request is issued by the payment system 16 to the UE 4 in step 220, which includes a UE identification (token) and the content ID. If necessary, settlement of at least a part of the total amount due is performed between the payment system 16, the core network, and the UE 4 in step 225. Details about alternative settlement methods are provided below. If the user agrees to pay the fee (and payment for at least part of the total has been settled, if required), the payment system 16 confirms payment with the UE 4 in step 230, and provides access credentials usable by the UE 4 in step 235 to request content from the CP 15 again, including the credentials that trigger final provision of the content.

Some optional elements of the inventive procedure of FIG. 3 are shown with dashed lines. For example, the system only requests agreement by the UE 4 in step 220 to pay a fee if the access information from the payment system 16 does not indicate the content can already be accessed by the UE 4. As another example, the system only requires settlement of the wallet in step 225 if the wallet's total amount due exceeds a predetermined threshold.

For settlement various alternative methods can be used. The UE 4 may request settlement from the user based on the current web session, i.e. via a window in the browser providing access to any payment methods and potentially other payment systems such as credit card companies or the like. Another alternative method is billing by the mobile operator, i.e. on the user's telephone bill, which is much easier for the customer, the operator of the mobile network 100 and the payment system 16.

For that purpose, for example, the payment system 16 may request payment from the operator network 100, e.g. via the AF 11 of FIG. 2. The mobile operator may then use alternative, trusted means to communicate to the user to request settlement of the total amount due, such as, for example, by means of one of the following

- the mobile operator may request settlement by sending an SMS or MMS to the customer which requests an SMS/MMS response which signals that an agreement has been signed.
- the mobile operator may request settlement by sending an SMS or MMS to the customer which comprises a link to an operator-provided web server that requests consent to pay a fee via a telephone bill.
- the UE 4 may have an app installed on it which provides secure communication between the operator network in the operator network domain 100 and the UE 4. The app may be able to receive requests for settlements via a telephone bill, and generate alert messages to the UE's 4 screen, which may request agreement for example by pushing a button or nodding to the camera, and transmit back to the network an agreement for payment.
- other methods of communication between the UE 4 and the network operator may be used that bypass the communication links established between the UE 4 and the payment system 16.
- the payment system 16 may select a method for settlement depending on the network from which access to the payment system 16 originates.

The methods for settlement of a wallet described above may alternatively be used for each single micropayment, so that an accounting to a wallet is circumvented.

A novel aspect and benefit of the present invention is the combination of mobile network 100 based identification and browser-based identification depending on the network used, so that mobile network based payment also becomes possible for UEs 4 accessing the payment system 16 via a WLAN 14/wireline 13 network, as described further below.

Figure 4:
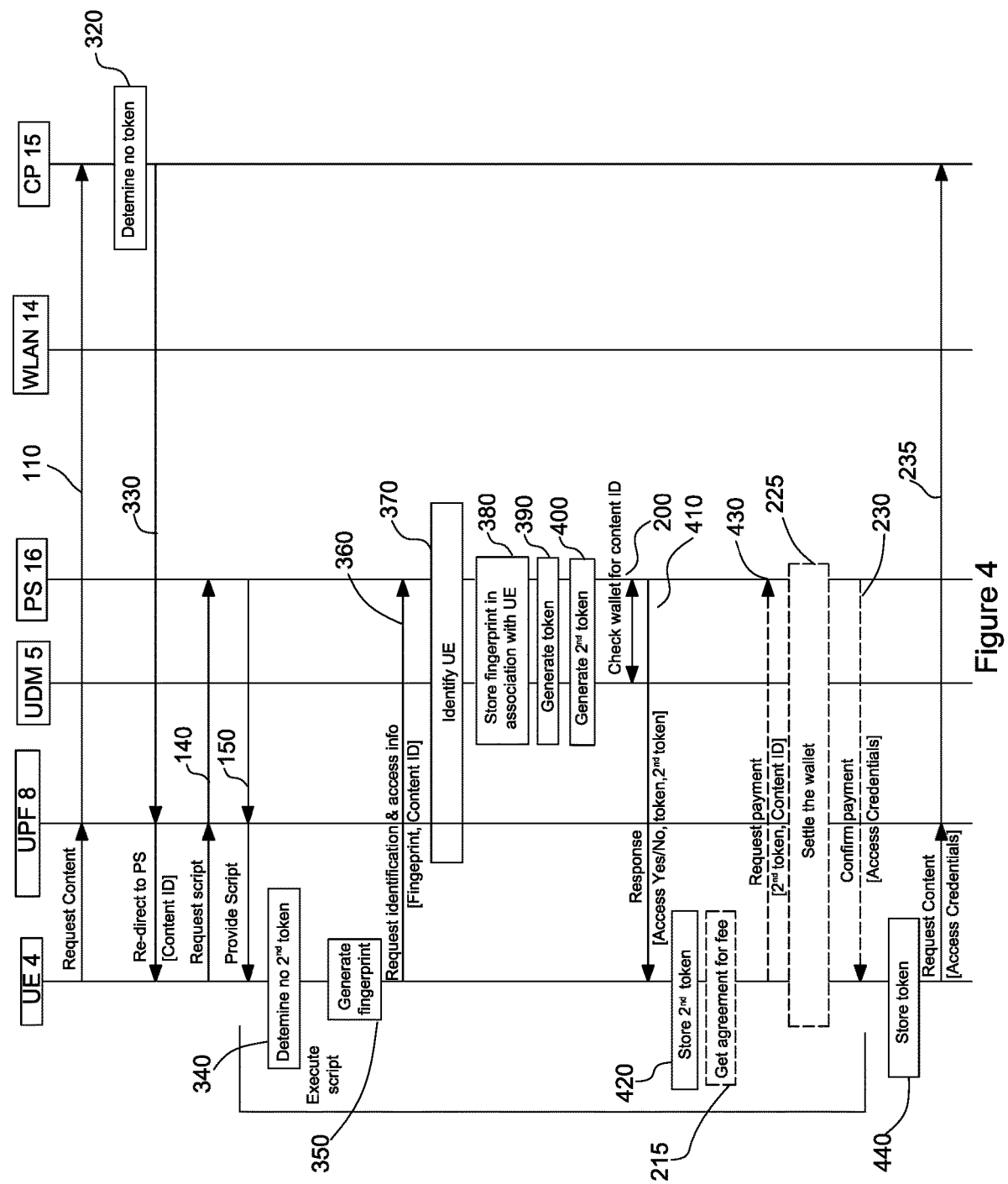
FIG. 4 presents a message sequence chart depicting a second method for identifying a user device in accordance with aspects of the present disclosures.

FIG. 4 shows an exemplary alternative method according to the present disclosure. The methods depicted in FIGS. 3 and 4 differ in that one of the tokens is present in method of FIG. 3, i.e., either the CP 15 associated token is used and only the CP 15 check for existence of a token. If no token is present, the method depicted in FIG. 4 presents an exemplary manner in which the token is generated and provided to the payment system 16 and only a CP 15 associated token is newly generated in the payment system and provided to the UE 4 for storage in association with the CP 15. Alternatively, only the payment system-associated token may be used, and only payment system 16 tokens are checked, generated and stored, respectively.

In step 110 of FIG. 4, the UE 4, having access to the internet through the mobile network of the operator network domain 100, requests content from a CP 15 via the UPF 8. In step 320, the CP 15 determines that no token has been stored on the UE 4. In step 330, the CP 15 responds with a re-direction of the request to the PS 16. This re-direction includes an identification of the content the user requested. In step 340, the payment system 16 determines that no token has been stored on the UE 4. In step 350, the UE 4 executes a script to generate a fingerprint. The UE 4 may then, in step 360 access the payment system 16, requesting identification of the UE 4 by the payment system 16, providing the fingerprint and the identification of the content the user requested. The UE is then identified in step 370.

After the UE 4 is identified in step 370, the fingerprint associated with the UE 4 is stored in the UDM 5 in step 380. A token is generated in step 390, and a second token in generated in step 400. In step 200 of FIG. 4, the payment system 16 checks the identified wallet to see whether the UE 4 may access the specific content identified. If the user has access, the payment system 16 responds with an access indication in step 410. Otherwise the payment system 16 responds by indicating that it is necessary to get the UE 4's agreement for payment in step 215, and a payment request is issued by the payment system 16 to the UE 4 in step 430, which includes a second UE identification (token) stored in step 420 and the content ID. In step 440, a token is stored in the UE 4.

FIGS. 3 and 4 show a content provisioning and payment system 16 that fully relies on identification from a mobile network 100. The checks for tokens and generation of fingerprint and/or tokens described in FIGS. 3 and 4 have been in preparation for the exemplary procedures described in FIGS. 5 and 6.

Figure 5:
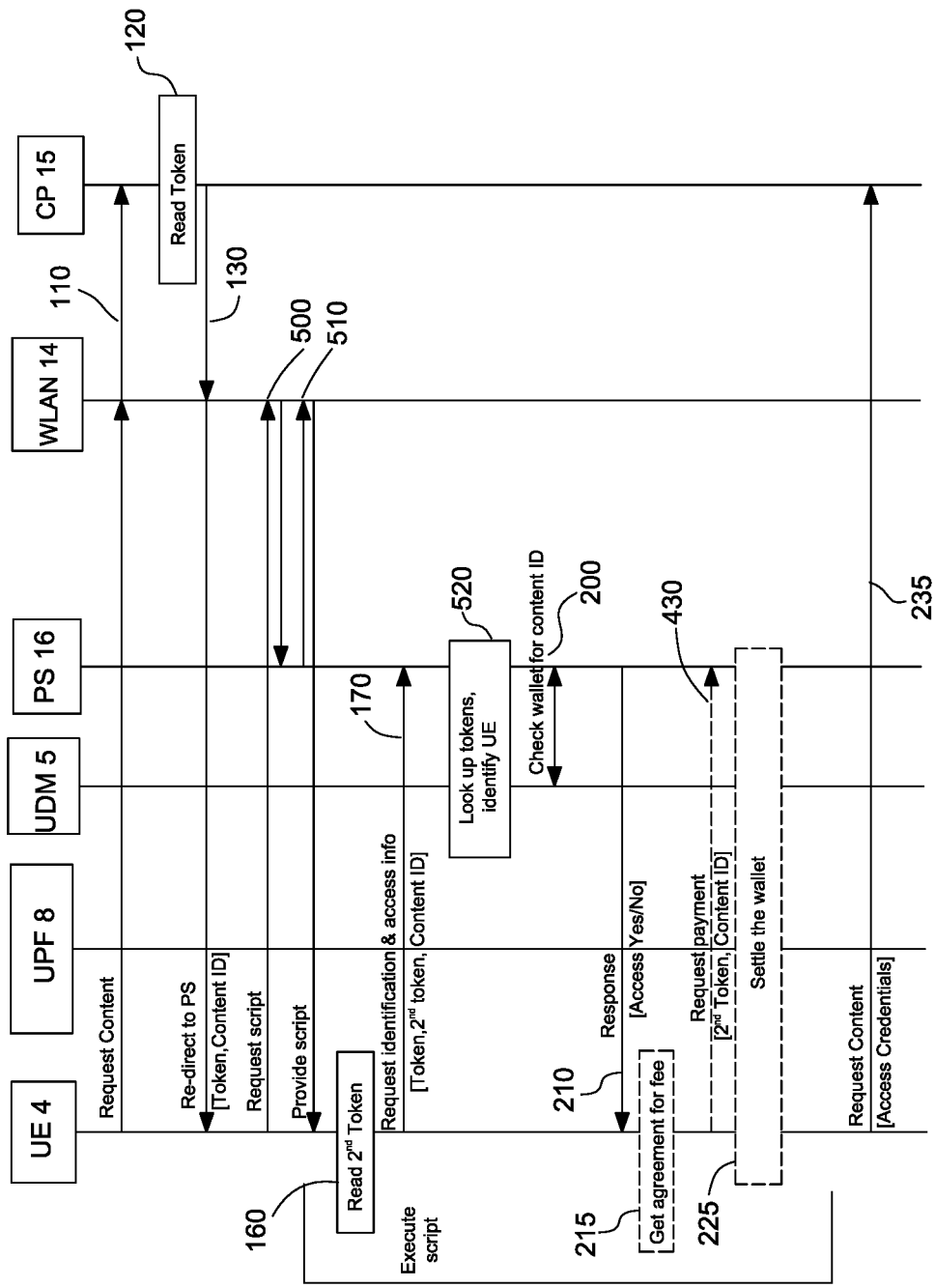
FIG. 5 presents a message sequence chart depicting a third method for identifying a user device in accordance with aspects of the present disclosures.

FIG. 5 shows another exemplary procedure for a UE 4 to access the CP 15 and to request content via the WLAN 14 access. FIG. 5 assumes tokens are stored on the UE 4 in association with the CP 15 and the payment system 16. In other words, the UE 4 has visited the CP 15 and the payment system 16 before, e.g. through the mobile network of the Operator Network Domain 100 and as described, for example, in FIG. 4.

The UE 4 provides both tokens to the payment system 16, which uses the tokens to look up the identity of the UE 4 in step 520 of FIG. 5. The payment system 16 at that point cannot rely on the mobile network in the Operator Network Domain 100 to identify the UE 4 as the connection from UE 4 to the CP 15 or to the payment system 16 does not pass through the mobile network. In step 500, the re-direction to the payment system may be in the form of a re-direct order which includes a hyper-link to an address of the payment system 16 to enable the UE 4 to request an executable script from the PS 16 which was obtained via WLAN 14. The re-direction may also be in form of a link to a script provided by the payment system 16 as shown in step 510 that needs to be loaded to the UE 4 and executed which was also obtained via WLAN 14. Once the UE 4 is identified via the token, the procedure can continue as described in FIGS. 3 and 4.

Again, use of only one of the two types of tokens is sufficient for the current invention. Both CP 15 and payment system 16-related tokens are only described herein for the sake of completeness, and to show the possible implementation options the invention offers.

The payment and/or settlement can still be operator supported. Because of the inventive identification of the UE 4, the operator can still use SMS or app-based payment systems, or any other system that makes use of the secure connection of the UE 4 to the payment system 16 via the mobile network 100. This opportunity for the mobile operator is provided by the current invention based on the combined usage of browser-based identities and mobile network identities for the UE 4.

Figure 6:
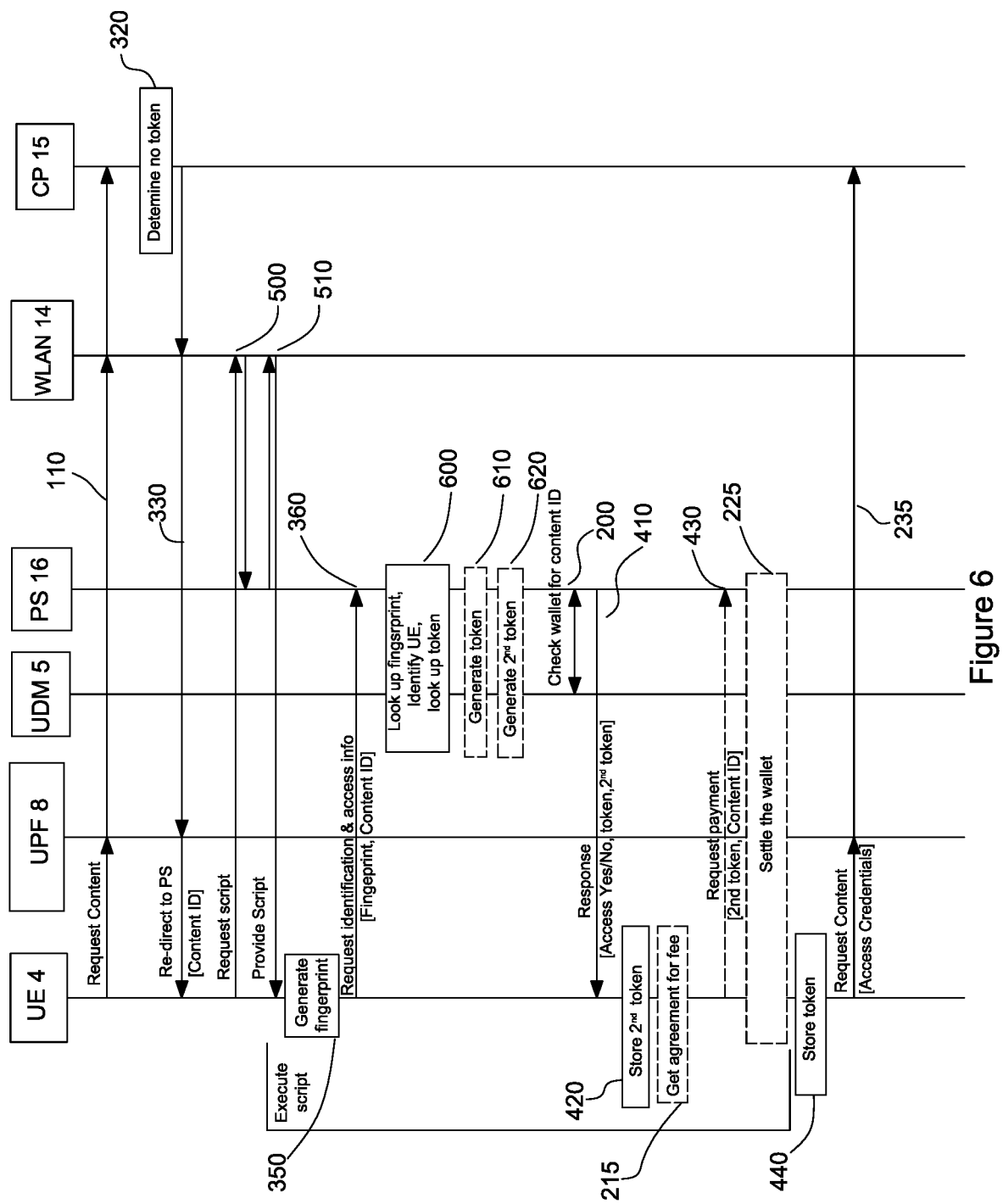
FIG. 6 presents a message sequence chart depicting a fourth method for identifying a user device in accordance with aspects of the present disclosures.

If, as depicted in another exemplary procedure illustrated by FIG. 6, the UE 4 accessing the CP 16 does not have any tokens, the UE 4 will generate local fingerprint information (for example, a browser fingerprint) and provide this to the payment system 16 as shown in steps 350 and 360. The payment system 16 looks up the fingerprint in the UDM 5 and also checks whether tokens are stored with the UE 4 identification (this would be the case when tokens had been generated and stored in the UE 4 and the UDM 5 before, but they were deleted in the UE 4) in step 600. Depending on whether tokens are available in the UDM 5, new tokens are generated or the stored tokens are provided to the UE 4 in a response as shown in steps 610 and 620. Also, the payment system 16 looks up access rights for the content requested, and provides access information to the UE 4 shown in step 410. The UE 4 may then perform the necessary tasks for agreement to pay by the user and settle the wallet in a manner similar to that previously described. Settlement is again possible via operator based methods because of the inventive use of a fingerprint, tokens and mobile network based subscription.

Figure 7:
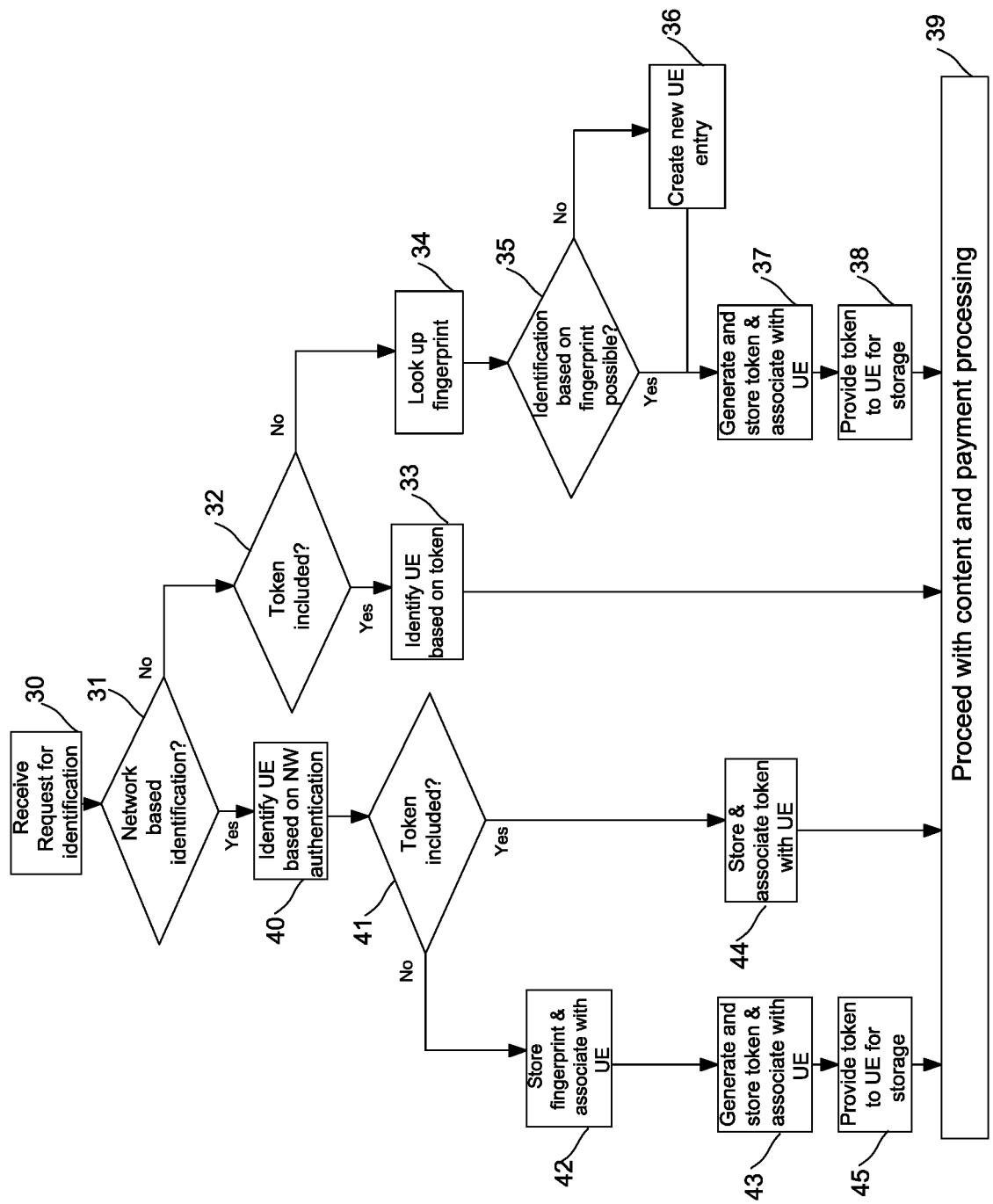
FIG. 7 presents a flow diagram depicting a method for selecting among the methods of FIGS. 3 to 6.

FIG. 7 depicts another exemplary procedure for identifying a UE 4 and generating identification information for a UE 4 accessing a payment system 16. The procedure may be performed in the payment system 16 with the support of a mobile network operator, or it may be performed by a mobile network in the Operator Network domain 100. In relation to FIGS. 3 to 6, this procedure starts at the point when the executable script is requested from the PS 16.

A request for identification of a UE 4 is received in the payment system 16 at step 30. The payment system 16 may be informed by a mobile network operator about connections (PDU sessions) setup to the payment system 16 so that the payment system 16 can determine at step 31 whether a network-based identification is possible. If it is possible, the UE 4 is identified at step 40, e.g. by information received from the network in combination with the connection used by the UE 4 to connect to the payment system 16. The payment system 16 may then determine at step 41 whether token information is available to identify the UE 4, if tokens are available, they are stored at step 44 in the UDM 5 in association with the UE 4. This step may not be necessary, if the tokens are already known to the UDM 5 in association with the UE 4. If tokens are not available, a fingerprint should be present in the request received from the UE 4 and the fingerprint is stored at step 42 in association with the UE 4. Tokens are then generated or read at step 43 from the UDM 5 and provided to the UE 4 at step 45 for storage and later use.

If no network based identification is available, e.g. because the UE 4 accesses the payment system 16 through a WLAN 14, the payment system 16 checks at step 32 whether tokens are available to identify the UE 4. If tokens are available, the tokens are looked up in the UDM 5 of the mobile network operator and the UE 4 is identified at step 33. If no tokens are available a fingerprint should be present in the request received from the UE 4. If the fingerprint can be looked up successfully at step 34, new tokens are generated at step 37 and provided to the UE 4 at step 38 for storage and use in subsequent access attempts. If the fingerprint lookup fails (or if tokens are available that are unknown in the UDM 5, and thus lookup fails, which is a scenario not shown in FIG. 7) this is an indication that the UE 4 is unknown to the payment system 16 and probably accessed for the first time. A new entry is generated at step 36 in the UDM 5, and tokens are generated and provided to the UE 4 as described above.

In case a UE 4 entry is created anew and new tokens are generated, one can see the benefits of the current invention. If the same UE 4 accesses the payment system 16 at any time later through the mobile network 100, the UE 4 is identified based on the network but the tokens are provided to the payment system 16 for storage in association with the UE 4, for identifying the new entry, and for combining it with existing UDM 5 entries for the identified subscriber, as described with reference to and depicted in FIG. 3.

Another aspect of the current invention is an alternative implementation in the UE 4 that forces the UE 4 to always use the mobile network 100 for accessing the payment system 16 even if the CP 15 is accessed via other networks. This would lead to the mobile network 100 always being able to identify the UE 4 based on mobile network subscription if the mobile network is available. The procedures described above with relation to FIGS. 4 and 5 would only apply if the CP 15 is accessed via a path other than through the mobile network, and such mobile network is unavailable.

This alternative would require filters or policies in the UE 4, potentially set by the mobile network operator during registration of the UE 4 or setup of a PDU session that direct connections to the payment system 16 through the mobile network 100 even if the originating application (e.g. the browser) is currently using, for example, a WLAN 14 connection. Such directing methods are currently not implemented in mobile device (as they would give mobile network operator power of the use of private WLAN 14 connection), but they should not be excluded by this invention.

We claim:

1. A computer-implemented method for a payment system having direct access to a mobile communication network via a stand-alone data network, the mobile communication network including at least one Policy Control Function ("PCF"), at least one Authentication and Mobility Function ("AMF"), at least one Session Management Function ("SMF"), at least one User Data Management ("UDM"), at least one User Plane Function ("UPF") and at least one Application function (AF"), wherein a user device ("UE") registered with the mobile communication network requests a first purchase by accessing a content provider system via an internet data network in communication with the mobile communication network in a first Protocol Data Unit ("PDU") session of the mobile communication network, comprising the steps of:
   a. the content provider system redirecting the UE to the payment system via the internet data network in communication with the mobile communication network;
   b. the UE requesting a second PDU session to connect to the payment system over the stand-alone data network via the at least one AMF and at least one SMF of the mobile communication system;

c. the payment system receiving via the at least one UPF, over the second PDU session in the mobile communication network, a request for payment of a purchase amount for the first purchase;
d. the payment system transmitting a request signal to the at least one AF of the mobile communication network for a network identifier of the UE based on an identification of the second PDU session, wherein the at least one AF is operable to receive the network identifier from the at least one PCF or the at least one UDM;
e. receiving, from the at least one AF of the mobile communication network, the network identifier of the UE in response to the transmitted request signal for such identifier, wherein the network identifier is specific to the UE and the payment system;
f. transmitting a script to the UE to determine whether at least one data token of the UE is maintained in a memory of the UE indicative of a prior communication between the UE and the payment system and/or the content provider system or in the at least one UDM in association with the network identifier of the UE;
g. generating a second data token when only one data token is maintained in the memory of the UE and the only one token is indicative of a prior communication between the UE and content provider system, wherein the generated data token is indicative of a communication between the UE and the payment system;
h. if generated, transmitting the generated data token to the UE for storage when the generated data token is not determined to be maintained in the UE memory;
i. transmitting at least one of the generated data token or the at least one data token via the at least one AF for storage in the at least one UDM in association with the network identifier of the UE;
j. determining, based on the network identifier of the UE, a credit worthiness indicator associated with the UE;
k. transmitting an authorization signal to the UE, the authorization signal including access credentials for the UE to provide to the content provider system for the requested purchase, without concurrently requiring payment from the UE for the purchases when the creditworthiness indicator satisfies predetermined conditions;
l. monitoring a total outstanding purchase balance of an account associated with the UE; and
m. transmitting a request signal for the UE for settlement of at least a part of the total outstanding purchase balance of the account associated with network identifier of the UE if the total outstanding purchase balance exceeds a predetermined threshold amount.

2. The computer-implemented method of claim 1, further comprising the steps of:
the UE receiving, over a wireline data network, information indicative of a price of a second purchase requested from the content provider system by the UE and information from the data token stored in the UE;
determining, based on the information from the data token, the credit worthiness indicator associated with the UE;
transmitting an authorization signal to the content provider system for the requested purchase without concurrently requiring payment for the purchases when the creditworthiness indicator satisfies predetermined conditions;
monitoring a total outstanding purchase balance of an account associated with the information of the data token; and
transmitting a request signal for the UE for settlement of at least a part of the total outstanding purchase balance of the account associated with the information of the data token if the total outstanding purchase balance exceeds a predetermined threshold amount.

3. The computer-implemented method of claim 1 further comprising the step of transmitting a signal via the at least one AF of the mobile communication network for storage in the at least one UDM, wherein the transmitted signal enables the mobile communication network to maintain information associated with at least one of the data tokens corresponding to the network identifier of the UE.

4. The computer-implemented method of claim 1 further comprising the step of receiving a signal from the mobile communication network indicative of at least one token associated with the UE, and inhibiting the step of transmitting the signal to the mobile communication network when the received signal from the mobile communication network is indicative of the at least one token that would otherwise have been transmitted.

5. The computer-implemented method of claim 1 wherein the network identifier of a UE is a generated device fingerprint.

6. The computer-implemented method of claim 1 further comprising the step of creating an account in the payment system for the UE when no account exists associated with at least one of the data tokens or the network identifier of the UE.

7. The computer-implemented method of claim 1 further comprising the step of creating a combined account in the payment system for the UE when more than one account exists associated with at least one of the data tokens or the network identifier of the UE.

8. The computer-implemented method of claim 7 wherein the combined account is one of the existing accounts associated with the at least one of the data tokens or the network identifier of the UE.

9. The computer-implemented method of claim 1 wherein the authorization signal is generated in substantial absence of registration or login to the payment system or to the content provider system by a user associated with the UE.

10. The computer-implemented method of claim 1 wherein the authorization signal is generated in substantial absence of identifying a user associated with the UE.

11. The computer-implemented method of claim 1 wherein the payment system is associated with an operator of the mobile communication network.

12. A computer-implemented method for a payment system having direct access to a mobile communication network via a stand-alone data network, the mobile communication network including at least one Policy Control Function ("PCF"),"), at least one Authentication and Mobility Function ("AMF"), at least one Session Management Function ("SMF"), at least one User Data Management ("UDM"), at least one User Plane Function ("UPF") and at least one Application function ("AF"), wherein a user device ("UE") registered with the mobile communication network requests a first purchase by accessing a content provider system via an internet data network in communication with the mobile communication network in a first Protocol Data Unit ("PDU") session of the mobile communication network, comprising the steps of:
a. the content provider system redirecting the UE to the payment system via the internet data network in communication with the mobile communication network;
b. the UE requesting a second PDU session to connect to the payment system over the stand-alone data network via the at least one AMF and at least one SMF of the mobile communication system;

c. the payment system receiving via the at least one UPF, over the second PDU session in the mobile communication network a request for payment of a purchase amount for the first purchase;

d. the payment system transmitting a request signal to the at least one AF of the mobile communication network for a network identifier of the UE based on an identification of the second PDU session, wherein the at least one AF is operable to receive the network identifier from the at least one PCF or the at least one UDM and wherein the network identifier is specific to the UE and the payment system;

e. receiving from the UE an identifier generated based on information maintained by the UE;

f. generating at least one data token based in part on the received identifier from the UE;

g. transmitting the generated data token to the UE for storage, wherein the generated data token is associated with at least one of the payment system and the content provider system;

h. transmitting a signal via the at least one AF of the mobile communication network for storage in the at least one UDM, wherein the transmitted signal enables the mobile communication network to maintain information associated with the identifier of the UE and or the generated data token in correspondence with the network identifier of the UE;

i. determining, based on the network identifier of the UE, a credit worthiness indicator associated with the UE;

j. transmitting an authorization signal to the UE, the authorization signal including access credentials for the UE to provide to the content provider system for the requested purchase without concurrently requiring payment from the UE for the purchases when the credit-worthiness indicator satisfies predetermined conditions;

k. monitoring a total outstanding purchase balance associated with the UE; and l. transmitting a request signal for the UE for settlement of at least a part of the total outstanding purchase balance associated with the UE identifier if the total outstanding purchase balance exceeds a predetermined threshold amount.

13. The computer-implemented method of claim 12 further comprising the step of creating an account in the payment system for the UE when no account exists associated with the network identifier of the UE.

14. The computer-implemented method of claim 12 wherein the step of generating the identifier of the UE comprises generating a device fingerprint.

15. A computer-implemented method for a payment system having direct access to a mobile communication network via a stand-alone data network, the mobile communication network including at least one Policy Control Function ("PCF"), at least one Authentication and Mobility Function ("AMF"), at least one Session Management Function ("SMF") at least one User Data Management ("UDM"), at least one User Plane Function ("UPF") and at least one Application function (AF"), wherein a user device ("UE") registered with the mobile communication network requests a first purchase by accessing a content provider system via an internet data network in communication with the mobile communication network in a first Protocol Data Unit ("PDU") session of the mobile communication network, comprising the steps of:

a. the content provider system redirecting the UE to the payment system via the internet data network in communication with the mobile communication network;

b. the UE requesting a second PDU session to connect to the payment system over the stand-alone data network via the at least one AMF and at least one SMF of the mobile communication system;

c. receiving via the at least one UPF, over a second PDU session in the mobile communication network, information indicative of an amount of a purchase requested from an a content provider system by the UE in substantial absence of an identifier of the UE;

d. receiving from the UE an identifier of the UE, wherein the identifier was generated based on information maintained by the UE;

e. transmitting a request signal to the at least one AF of the mobile communication network for a network identifier of the UE based on an identification of the second PDU session, wherein the at least one AF is operable to receive the network identifier from the at least one PCF or the at least one UDM and wherein the network identifier is specific to the UE and the payment system;

f. receiving, from the at least one AF of the mobile communication network, the network identifier of the UE in response to the transmitted request signal for such identifier;

g. generating at least one data token based in part on the received identifier of the UE;

h. transmitting the generated data token to the UE for storage;

i. transmitting a signal via the at least one AF of the mobile communication network containing information indicative of the identifier of the UE and the at least one generated token for storage in the at least one UDM, wherein the transmitted signal enables the mobile communication network-to maintain information associated with the identifier of the UE and the at least one generated data token in association with the network identifier of the UE; and j. executing a settlement action by the mobile device with reference to the purchase amount.

16. The computer implemented method of claim 15 further comprising the step of creating an account in the payment system for the UE when no account exists associated with the at least one UE identifier or information in the at least one data token.

17. The computer implemented method of claim 15 wherein the step of generating the identifier of the UE comprises generating a device fingerprint.

18. The computer-implemented method of claim 15, wherein the step of executing the settlement action comprises the steps of:

a. determining that the purchase amount is less than a predetermined threshold amount qualifying for deferred payment; and b. recording in a memory of the payment system, the purchase amount in a ledger entry in an account associated with at least one of the UE identifier and information in the at least one data token.

19. The computer-implemented method of claim 15, wherein the step of executing the settlement action comprises the steps of:

a. determining that the purchase amount is greater than a predetermined threshold amount;

b. transmitting a settlement request to a credit card company server or a bank server including information corresponding to an account associated with at least one of the UE identifier and information in the at least one data token; and c. receiving a confirmation signal from the credit card company server or bank server confirming that payment has been made.

20. The computer-implemented method of claim 15, wherein the step of executing a settlement action comprises the steps of:

a. determining, based on at least one of the UE identifier and information in the at least one generated data token, a credit worthiness indicator associated with the UE;

b. transmitting an authorization signal to the content provider system for the requested purchase without concurrently requiring payment for the purchases when the creditworthiness indicator satisfies predetermined conditions;

c. monitoring a total outstanding purchase balance associated with at least one of the UE identifier or the information in the at least one data token; and d. transmitting a request signal to the UE for settlement of at least a part of the total outstanding purchase balance associated with the UE identifier if the total outstanding purchase balance exceeds a predetermined threshold amount.

* * * * *